US012639511B2

(12) United States Patent
Raheja et al.

(10) Patent No.: US 12,639,511 B2
(45) Date of Patent: May 26, 2026

(54) MEMORY-BASED FUNCTION CALLING FOR LOGICAL FORMULATION AND INFERENCE FOR LARGE LANGUAGE MODELS

(71) Applicant: Cisco Technology, Inc., San Jose, CA (US)

(72) Inventors: Tarun Raheja, Philadelphia, PA (US); Advit Deepak, San Jose, CA (US); William Healy, Riverside, CT (US); Jayanth Srinivasa, San Jose, CA (US); Gaowen Liu, Austin, TX (US); Ramana Rao V. R. Kompella, Foster City, CA (US); Raunak Sinha, Los Angeles, CA (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 18/439,966

(22) Filed: Feb. 13, 2024

(65) Prior Publication Data

US 2025/0258999 A1     Aug. 14, 2025

(51) Int. Cl.
    *G06F 40/205*        (2020.01)
(52) U.S. Cl.
    CPC ................................. *G06F 40/205* (2020.01)
(58) Field of Classification Search
    CPC .............................. G06F 40/30; G06F 40/205
    See application file for complete search history.

(56) References Cited

U.S. PATENT DOCUMENTS

| | | | |
|---|---|---|---|
| 12,229,174 B1* | 2/2025 | Halder | G06F 16/3331 |
| 2021/0365817 A1* | 11/2021 | Riegel | G06F 18/29 |
| 2023/0142543 A1* | 5/2023 | Santos | G06N 5/048 |
| | | | 706/46 |
| 2023/0169962 A1* | 6/2023 | Latapie | G10L 15/24 |
| | | | 704/9 |

(Continued)

OTHER PUBLICATIONS

Ye, Xi, et al. "Satlm: Satisfiability-aided language models using declarative prompting." Advances in Neural Information Processing Systems 36 (2023): 45548-45580. (Year: 2023).*

(Continued)

*Primary Examiner* — Anne L Thomas-Homescu
(74) *Attorney, Agent, or Firm* — Lee & Hayes, P.C.

(57)            ABSTRACT
In one embodiment, a method comprises: parsing, using a large language model, a constraint satisfaction problem statement into a sequence of sentences corresponding to a plurality of individual problem sentences and a plurality of individual answer choices; invoking respective primitives from a set of logical-linguistic primitive functions to iteratively process i) each of the plurality of individual problem sentences to establish a respective problem constraint with accompanying arguments and ii) each of the plurality of individual answer choices to establish a respective answer choice constraint with accompanying arguments; storing, during invoking, the respective problem constraints into an aggregate list of problem constraints; and solving, after completion of the aggregate list of problem constraints, the constraint satisfaction problem statement as a validity output for each answer choice constraint given the aggregate list of problem constraints.

20 Claims, 7 Drawing Sheets

(56) References Cited

U.S. PATENT DOCUMENTS

| | | | | |
|---|---|---|---|---|
| 2023/0252224 A1* | 8/2023 | Tran | ........................ | G06F 40/56 |
| | | | | 715/256 |
| 2025/0018562 A1* | 1/2025 | Xia | ........................ | B25J 9/1653 |
| 2025/0052894 A1* | 2/2025 | Farris | ....................... | G01S 13/90 |
| 2025/0054322 A1* | 2/2025 | Ye | ........................ | G06F 40/279 |

OTHER PUBLICATIONS

Olausson, Theo, et al. "LINC: A neurosymbolic approach for logical reasoning by combining language models with first-order logic provers." Proceedings of the 2023 Conference on Empirical Methods in Natural Language Processing. 2023. (Year: 2023).*

Arkoudas K., "GPT-4 Can't Reason", Position Paper, arXiv:2308.03762v2 [cs.CL], Aug. 10, 2023, pp. 1-53.

Brown T.B., et al., "Language Models are Few-Shot Learners", arXiv:2005.14165v4 [cs.CL], Jul. 22, 2020, pp. 1-75.

Bubeck S., et al., "Sparks of Artificial General Intelligence: Early Experiments with GPT-4", arXiv:2303.12712v5 [cs.CL], Apr. 13, 2023, pp. 1-155.

Chen W., et al., "Program of Thoughts Prompting: Disentangling Computation from Reasoning for Numerical Reasoning Tasks", Published in Transactions on Machine Learning Research, arXiv:2211.12588v4 [cs.CL], Oct. 23, 2023, Reviewed on https://openreview.net/forum?id=YfZ4ZPt8zd, 20 Pages.

Clark P., et al., "Transformers As Soft Reasoners over Language", arXiv:2002.05867v2 [cs.CL], May 5, 2020, 15 Pages.

Cobbe K., et al., "Training Verifiers to Solve Math Word Problems", arXiv:2110.14168v2 [cs.LG], Nov. 18, 2021, pp. 1-22.

Eleti A., et al., "Function Calling and Other API Updates", OpenAI, Jun. 13, 2023, Retrieved from https://openai.com/blog/function-calling-and-other-api-updates, 6 Pages.

Franceschelli G., et al., "On the Creativity of Large Language Models", arXiv:2304.00008v3 [cs.AI], Jul. 9, 2023, pp. 1-17.

Gao L., et al., "PAL: Program-aided Language Models", arXiv:2211.10435v2 [cs.CL], Jan. 27, 2023, pp. 1-34.

Guest O., et al., "On Logical Inference over Brains, Behaviour, and Artificial Neural Networks", Computational Brain Behavior, Springer, Feb. 13, 2023, Springer, Retrieved from https://doi.org/10.1007/s42113-022-00166-x, pp. 213-227.

Hao S., et al., "Reasoning with Language Model is Planning with World Model", arXiv:2305.14992v2 [cs.CL], Oct. 23, 2023, 20 Pages.

He-Yueya J., et al., "Solving Math Word Problems by Combining Language Models With Symbolic Solvers", arXiv:2304.09102v1 [cs.CL], Apr. 16, 2023, pp. 1-7.

Huang J., et al., "Towards Reasoning in Large Language Models: A Survey", arXiv:2212.10403v2 [cs.CL], May 26, 2023, 15 Pages.

Mayo M., "Unraveling the Power of Chain-of-Thought Prompting in Large Language Models", KDnuggets in Artificial Intelligence, Jul. 6, 2023, Retrieved from https://www.kdnuggets.com/2023/07/power-chain-thought-prompting-large-language-models.html, 4 Pages.

OpenAI: "GPT-4 Technical Report", arXiv:2303.08774v4 [cs.CL], Dec. 19, 2023, pp. 1-100.

Pan L., et al., "Logic-LM: Empowering Large Language Models with Symbolic Solvers for Faithful Logical Reasoning", arXiv:2305.12295v2 [cs.CL], Oct. 19, 2023, 19 Pages.

Radford A., et al., "Improving Language Understanding by Generative Pre-Training", OpenAI, Jun. 11, 2018, retrieved from https://cdn.openai.com/research-covers/language-unsupervised/language_understanding_paper.pdf, pp. 1-12.

Rajasekharan A., et al., "Reliable Natural Language Understanding with Large Language Models and Answer Set Programming", Electronic Proceedings in Theoretical Computer Science, vol. 385, Aug. 30, 2023, pp. 274-287.

Schaeffer R., et al., "Are Emergent Abilities of Large Language Models a Mirage?", arXiv:2304.15004v2 [cs.AI], May 22, 2023, pp. 1-14.

Srivastava A., et al., "Beyond the Imitation Game: Quantifying and Extrapolating the Capabilities of Language Models", arXiv:2206.04615v3 [cs.CL], Jun. 12, 2023, pp. 1-95.

Wang G., et al., "Voyager: An Open-Ended Embodied Agent with Large Language Models", arXiv:2305.16291v2 [cs.AI], Oct. 19, 2023, Retrieved from https://voyager.minedojo.org, pp. 1-42.

Wang X., et al., "Self-consistency Improves Chain of Thought Reasoning in Language Models", Published as a conference paper at ICLR 2023, arXiv:2203.11171v4 [cs.CL], Mar. 7, 2023, pp. 1-24.

Wei J., et al., "Chain-of-Thought Prompting Elicits Reasoning in Large Language Models", 36th Conference on Neural Information Processing Systems (NeurIPS 2022), arXiv:2201.11903v6 [cs.CL], Jan. 10, 2023, pp. 1-43.

Wei J., et al., "Emergent Abilities of Large Language Models", Published in Transactions on Machine Learning Research, Aug. 31, 2022, Reviewed on https://openreview.net/forum?id=yzkSU5zdwD, arXiv:2206.07682v2 [cs.CL], Oct. 26, 2022, pp. 1-30.

Yao S., et al., "Tree of Thoughts: Deliberate Problem Solving with Large Language Models", 37th Conference on Neural Information Processing Systems (NeurIPS 2023), arXiv:2305.10601v2 [cs.CL], Dec. 3, 2023, pp. 1-14.

Zhao W.X., et al., "A Survey of Large Language Models", arXiv:2303.18223v13 [cs.CL], Nov. 24, 2023, pp. 1-124.

Zhu W., et al., "Multilingual Machine Translation with Large Language Models: Empirical Results and Analysis", arXiv:2304.04675v3 [cs.CL], Oct. 29, 2023, 16 Pages.

* cited by examiner

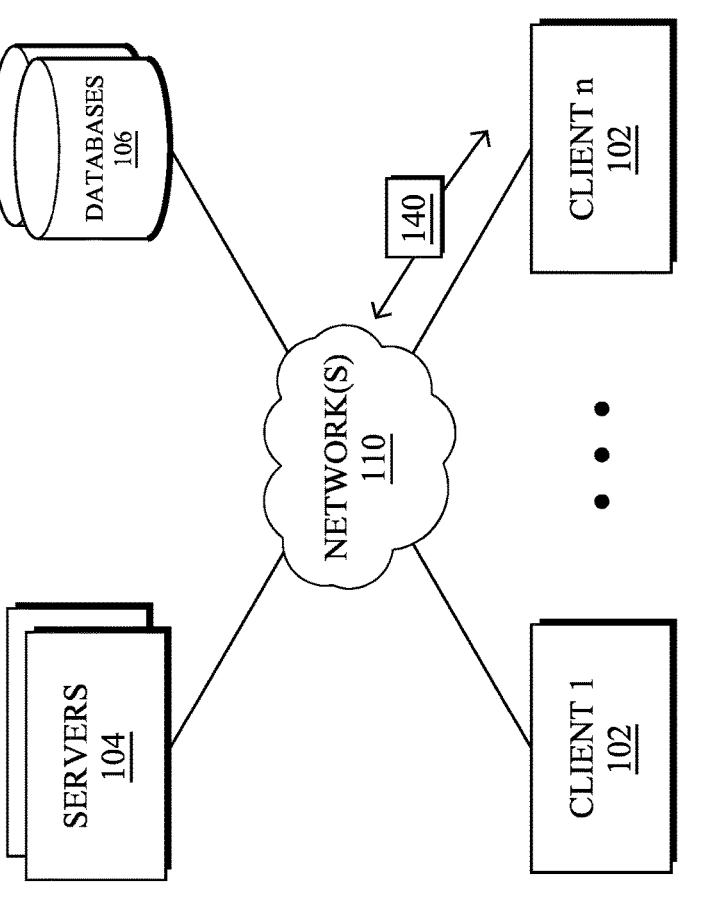
FIG. 1

Figure 3:
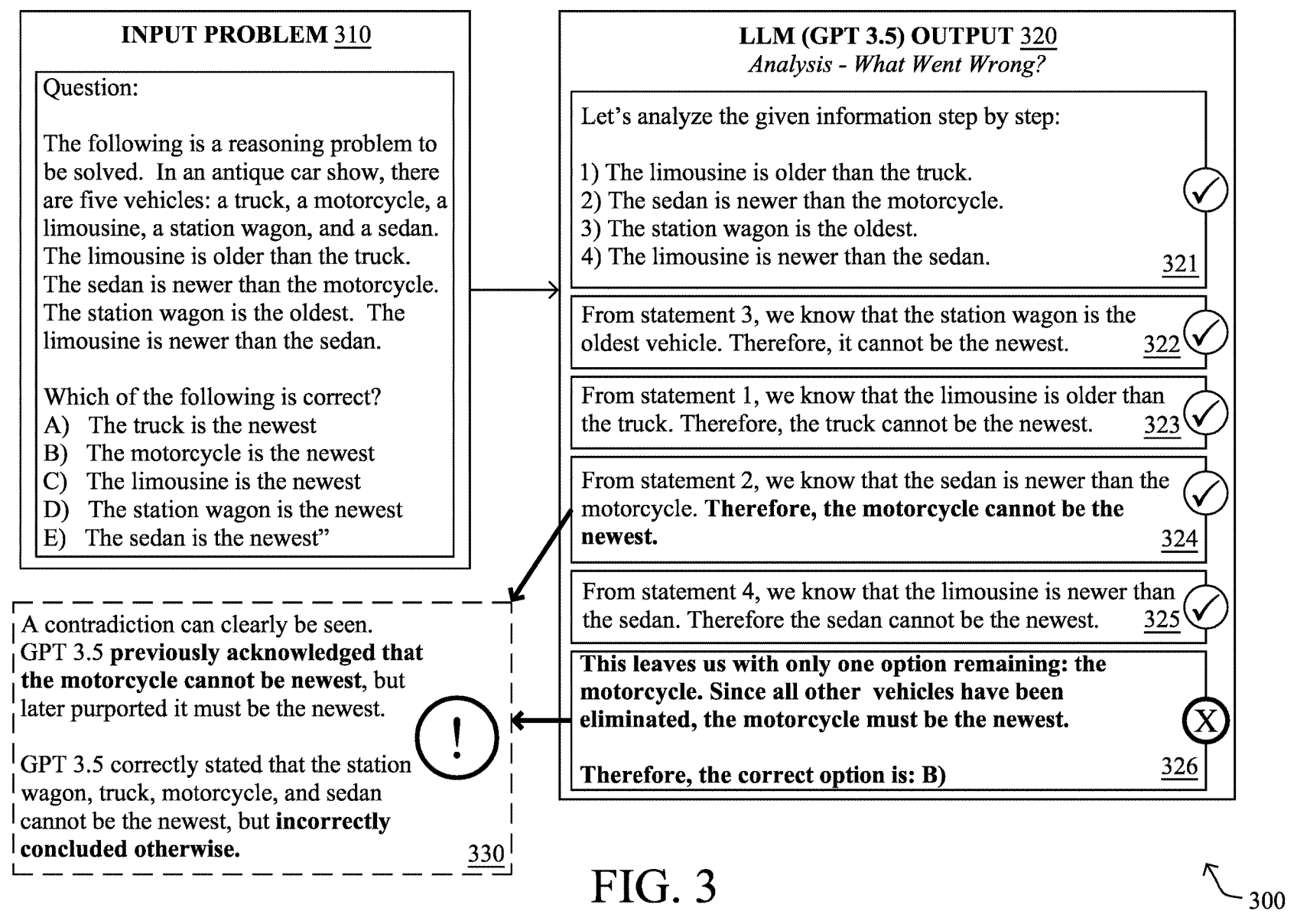

INPUT PROBLEM 310

Question:

The following is a reasoning problem to be solved. In an antique car show, there are five vehicles: a truck, a motorcycle, a limousine, a station wagon, and a sedan. The limousine is older than the truck. The sedan is newer than the motorcycle. The station wagon is the oldest. The limousine is newer than the sedan.

Which of the following is correct?

A) The truck is the newest
B) The motorcycle is the newest
C) The limousine is the newest
D) The station wagon is the newest
E) The sedan is the newest"

LLM (GPT 3.5) OUTPUT 320
*Analysis – What Went Wrong?*

Let's analyze the given information step by step:

1) The limousine is older than the truck.
2) The sedan is newer than the motorcycle.
3) The station wagon is the oldest.
4) The limousine is newer than the sedan.

321

From statement 3, we know that the station wagon is the oldest vehicle. Therefore, it cannot be the newest.

322

From statement 1, we know that the limousine is older than the truck. Therefore, the truck cannot be the newest.

323

From statement 2, we know that the sedan is newer than the motorcycle. Therefore, the motorcycle cannot be the newest.

324

From statement 4, we know that the limousine is newer than the sedan. Therefore the sedan cannot be the newest.

325

This leaves us with only one option remaining: the motorcycle. Since all other vehicles have been eliminated, the motorcycle must be the newest.

Therefore, the correct option is: B)

326

330

A contradiction can clearly be seen. GPT 3.5 previously acknowledged that the motorcycle cannot be newest, but later purported it must be the newest.

GPT 3.5 correctly stated that the station wagon, truck, motorcycle, and sedan cannot be the newest, but incorrectly concluded otherwise.

500b

MEMORY 540

541 — "price"-specific Constraint Methods ① create_problem,
add_exact_rank_cheapest,
add_less_expensive,
check_rank_from_less_expensive,
add_exact_rank_more_expensive,
add_more_expensive 542 — List of Problem Constraints ②

- <constraint1>
- <constraint2>
- <constraint3>

CONSTRAINT SOLVER 550

551 — pyconstraint ③

Given:
- <constraint1>
- <constraint2>
- <constraint3>

Now, add:
- <constraintN>

552 — Solver Results ③

A) Impossible
B) Possible (T)
C) Impossible

LARGE LANGUAGE MODEL 530

531 — PROBLEM TYPE CLASSIFIER ①

"leftright" : [<list_of_methods>],
"price" : [<list_of_methods>],
"age" : [<list_of_methods>],
"competition" : [<list_of_methods>],

532 — METHOD CLASSIFIER & ARGUMENT EXTRACTION ② create_problem (mangoes, oranges, plums)

add_more_expensive (oranges, mangoes)

add_exact_rank_cheapest (plums, 0)

533 — METHOD CLASSIFIER & ARGUMENT EXTRACTION ③

A) The mangoes are the most expensive

B) The oranges are the most expensive

C) The plums are the most expensive

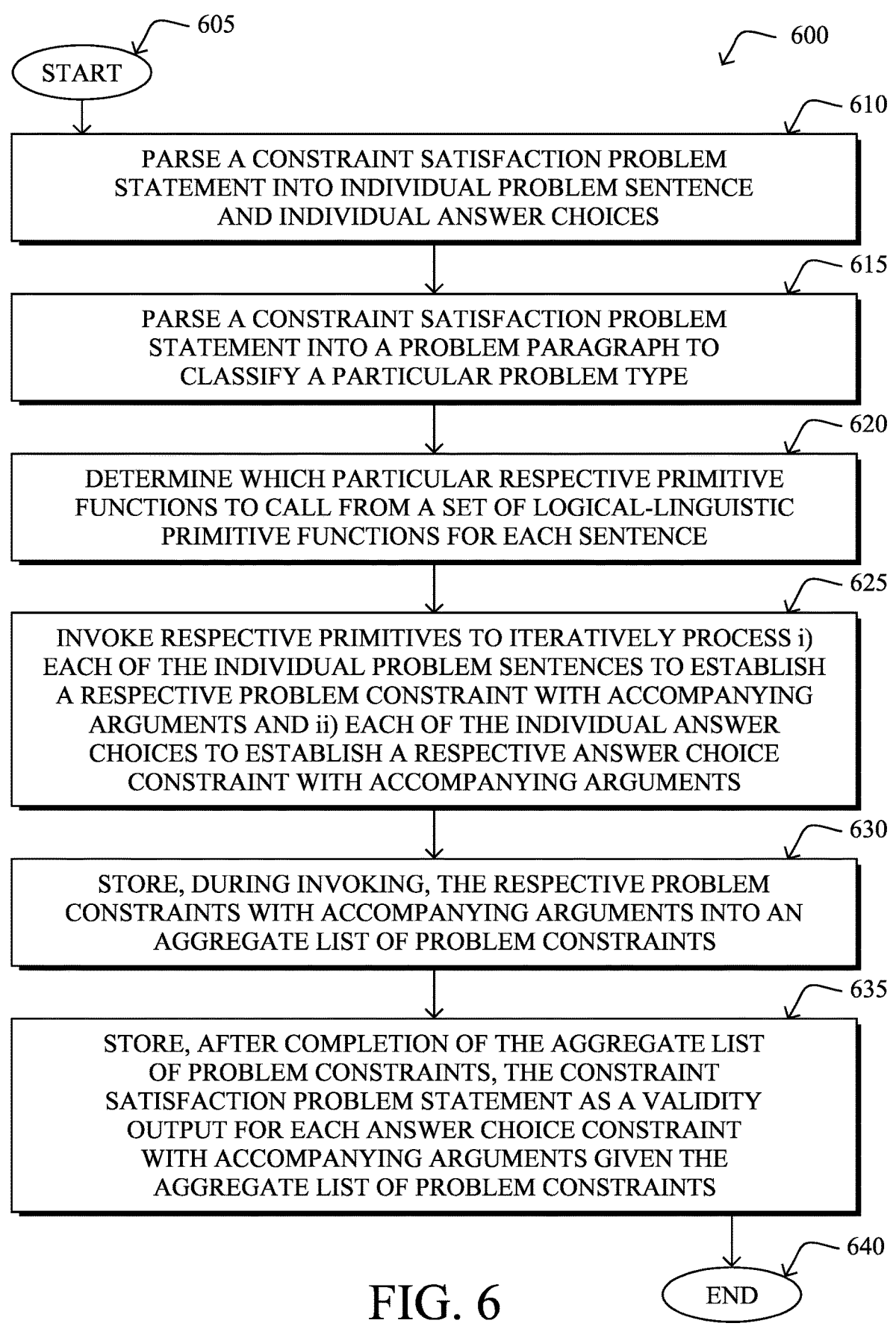

START

610

PARSE A CONSTRAINT SATISFACTION PROBLEM
STATEMENT INTO INDIVIDUAL PROBLEM SENTENCE
AND INDIVIDUAL ANSWER CHOICES

615

PARSE A CONSTRAINT SATISFACTION PROBLEM
STATEMENT INTO A PROBLEM PARAGRAPH TO
CLASSIFY A PARTICULAR PROBLEM TYPE

620

DETERMINE WHICH PARTICULAR RESPECTIVE PRIMITIVE
FUNCTIONS TO CALL FROM A SET OF LOGICAL-LINGUISTIC
PRIMITIVE FUNCTIONS FOR EACH SENTENCE

625

INVOKE RESPECTIVE PRIMITIVES TO ITERATIVELY PROCESS i)
EACH OF THE INDIVIDUAL PROBLEM SENTENCES TO ESTABLISH
A RESPECTIVE PROBLEM CONSTRAINT WITH ACCOMPANYING
ARGUMENTS AND ii) EACH OF THE INDIVIDUAL ANSWER
CHOICES TO ESTABLISH A RESPECTIVE ANSWER CHOICE
CONSTRAINT WITH ACCOMPANYING ARGUMENTS

630

STORE, DURING INVOKING, THE RESPECTIVE PROBLEM
CONSTRAINTS WITH ACCOMPANYING ARGUMENTS INTO AN
AGGREGATE LIST OF PROBLEM CONSTRAINTS

635

STORE, AFTER COMPLETION OF THE AGGREGATE LIST
OF PROBLEM CONSTRAINTS, THE CONSTRAINT
SATISFACTION PROBLEM STATEMENT AS A VALIDITY
OUTPUT FOR EACH ANSWER CHOICE CONSTRAINT
WITH ACCOMPANYING ARGUMENTS GIVEN THE
AGGREGATE LIST OF PROBLEM CONSTRAINTS

640

END

FIG. 6

MEMORY-BASED FUNCTION CALLING FOR LOGICAL FORMULATION AND INFERENCE FOR LARGE LANGUAGE MODELS

TECHNICAL FIELD

The present disclosure relates generally to computer networks, and, more particularly, to memory-based function calling for logical formulation and inference for large language models (LLMs).

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

Despite their rapid advancement, LLMs still continue to struggle with respect to tasks that require reasoning. To add this functionality, approaches such as Chain-of-Though (CoT) and similar approaches seek to break down the prompt to the LLM into smaller, discrete prompts that allow the model to perform the reasoning task as a series of intermediate steps. However, CoT and similar approaches have also been shown to produce wrong answers with high confidence and reason stepwise to the wrong answer. Thus, existing approaches to LLM-based reasoning are inadequate and can lead to incorrect results.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 1 illustrates an example computing system;

FIG. 3 illustrates an example of failure modes of a Chain of Thought (CoT) approach;

FIGS. 5A-5B illustrate an example processing of an input reasoning problem using memory-based function calling for logical formulation and inference for LLMs; and FIG. 6 illustrates an example procedure for memory-based function calling for logical formulation and inference for LLMs.

DESCRIPTION OF EXAMPLE EMBODIMENTS

Overview

Figure 2:
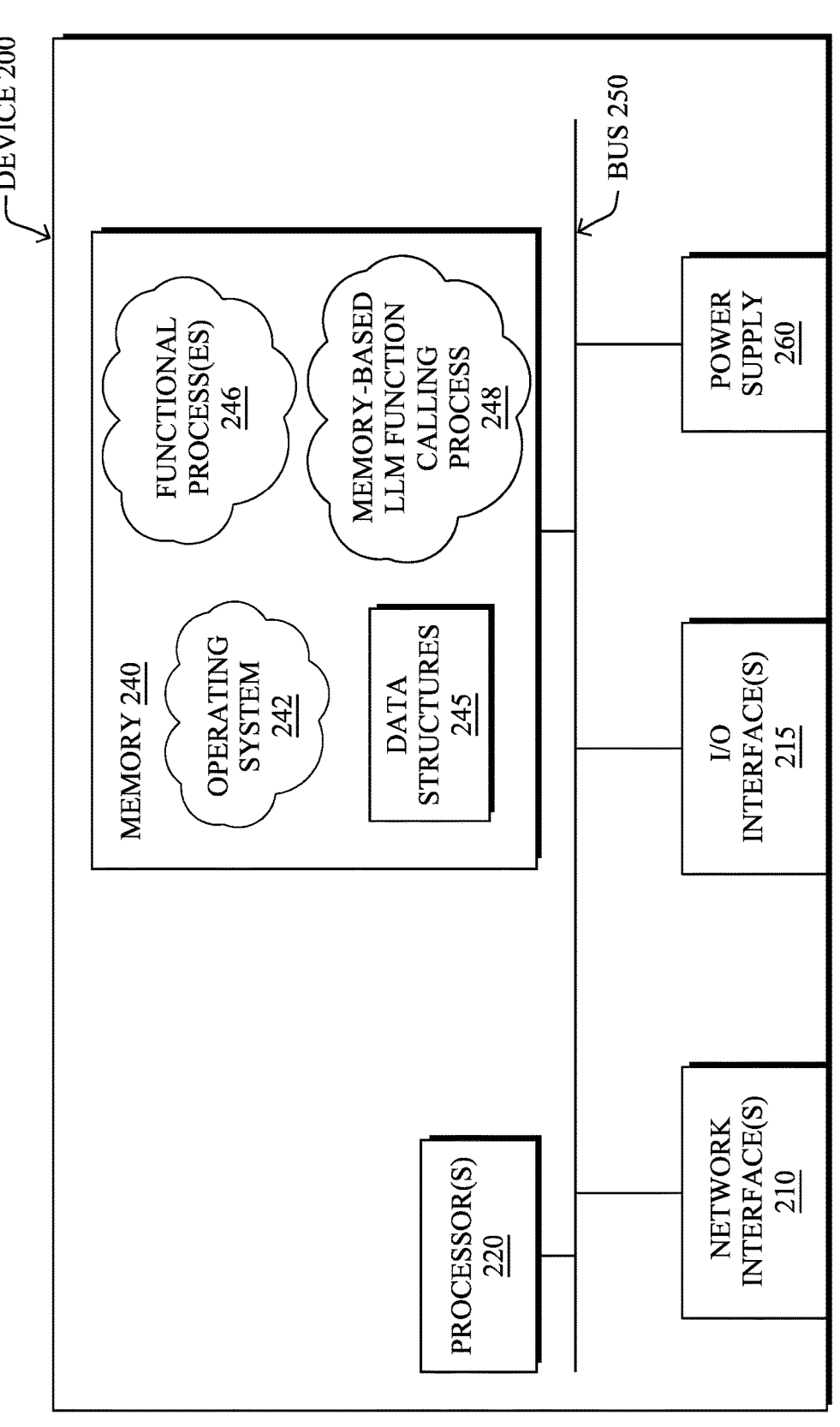
FIG. 2 illustrates an example network device/node.

According to one or more embodiments of the disclosure, a method herein may comprise: parsing, using a large language model, a constraint satisfaction problem statement into a sequence of sentences corresponding to a plurality of individual problem sentences and a plurality of individual answer choices; invoking respective primitives from a set of logical-linguistic primitive functions to iteratively process i) each of the plurality of individual problem sentences to establish a respective problem constraint with accompanying arguments and ii) each of the plurality of individual answer choices to establish a respective answer choice constraint with accompanying arguments; storing, during invoking, the respective problem constraints into an aggregate list of problem constraints; and solving, after completion of the aggregate list of problem constraints, the constraint satisfaction problem statement as a validity output for each answer choice constraint given the aggregate list of problem constraints.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a memory-based LLM function calling process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, memory-based LLM function calling process (process 248) may include computer executable instructions that, when executed by processor(s) 220, cause device 200 to perform the techniques described herein. To do so, in some implementations, process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, meanshift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Memory-Based Function Calling for Logical Formulation and Inference—

As noted above, the ability of large language models (LLMs) to follow instructions now allow for interactions with tools/plugins that are able to perform tasks such as searching the web, executing code, etc. As also noted above, while LLMs still continue to struggle with respect to tasks that require reasoning, approaches such as Chain-of-Though (CoT) and similar approaches seek to break down the prompt to the LLM into smaller, discrete prompts that allow the model to perform the reasoning task as a series of intermediate steps. Still, CoT and similar approaches have also been shown to produce wrong answers with high confidence and reason stepwise to the wrong answer.

FIG. 3, for example, illustrates a working example of failure modes of a Chain of Thought (CoT) approach. The following input problem 310 is inputted into an LLM 320 (e.g., GPT-3.5) for output:

"The following is a reasoning problem to be solved. In an antique car show, there are five vehicles: a truck, a motorcycle, a limousine, a station wagon, and a sedan. The limousine is older than the truck. The sedan is newer than the motorcycle. The station wagon is the oldest. The limousine is newer than the sedan.
Which of the following is correct?
A) The truck is the newest
B) The motorcycle is the newest
C) The limousine is the newest
D) The station wagon is the newest
E) The sedan is the newest"

The LLM 320 is instructed to utilize Chain-of-Thought (CoT) reasoning. Each section of GPT-3.5 output is analyzed. The first five sections of GPT-3.5's Chain-of-Thought reasoning are consistent with the input paragraph:

Section 321: Let's analyze the given information step by step: 1) The limousine is older than the truck. 2) The sedan is newer than the motorcycle. 3) The station wagon is the oldest. 4) The limousine is newer than the sedan. (CORRECT)

Section 322: From statement 3, we know that the station wagon is the oldest vehicle. Therefore, it cannot be the newest. (CORRECT)

Section 323: From statement 1, we know that the limousine is older than the truck. Therefore, the truck cannot be the newest. (CORRECT)

Section 324: From statement 2, we know that the sedan is newer than the motorcycle. Therefore, the motorcycle cannot be the newest. (CORRECT)

Section 325: From statement 4, we know that the limousine is newer than the sedan. Therefore, the sedan cannot be the newest. (CORRECT)

However, the model contradicts itself by stating in the sixth section, section 326, that the motorcycle must be the newest after previously stating it cannot be the newest.

Section 326: This leaves us with only one option remaining: the motorcycle. Since all other vehicles have been eliminated, the motorcycle must be the newest. Therefore, the correct option is: "B)" (INCORRECT)

Hence, it solves the problem incorrectly. That is, as stated in illustrated contradiction 330, a contradiction can clearly be seen. GPT 3.5 previously acknowledged that the motorcycle cannot be newest, but later purported it must be the newest. GPT 3.5 correctly stated that the station wagon, truck, motorcycle, and sedan cannot be the newest, but incorrectly concluded otherwise. Thus, as can be seen, existing approaches to LLM-based reasoning are inadequate and can lead to incorrect results.

The techniques herein, on the other hand, introduce a classification-based approach to support large language model (LLM)-based reasoning. The techniques herein enhance the reasoning capabilities of LLMs for Constraint Satisfaction Problems (CSPs), by converting reasoning problems into classification tasks. The techniques herein leverage the LLM's ability to decide when to call a function from a set of Logical-Linguistic Primitives, each of which can interact with a local "scratchpad" memory and logical inference engine. Invocation of these primitives in the correct order writes the constraints to the scratchpad memory, and enables verifiable solution of the problem by logical engines. The techniques herein additionally propose a formal framework for exploring the "linguistic" hardness of CSP reasoning-problems for LLMs.

Operationally, for the purpose of logical reasoning, the techniques herein introduce a set of Linguistic-Logical primitives. Each primitive is equipped with access to a local memory storage and an inference engine. The role of the LLM, in this context, is to parse the given problem statement, line by line, and decide upon the most appropriate primitive to call at each step. Each invoked primitive leads to either a write operation to the memory storage or the execution of a solution process. Due to the step-by-step nature of the model herein, the techniques herein are able to obtain explainable results and exact rankings of all objects.

In particular, let Q be a reasoning problem parsed line-by-line into a sequence of sentences $S=s_1, s_2, \ldots, s_n$. At each step i, the LLM produces a prediction $\hat{p}_i$ of the primitive operation to use for sentence $s_i$. This prediction task can be formalized as a classification problem:

$$\hat{p}_i = \underset{r \in R}{\mathrm{argmax}} P(r \mid s_i, \text{context}). \qquad \text{Eq. 1}$$

where R is the set of possible primitive operations, and the context encompasses the previous sentences and chosen primitives. Within this framework, some primitives may be responsible for writing to or reading from a memory structure, while others may invoke a specific logic engine to solve the reasoning problem held within the memory. This formulation provides a systematic approach to model complex reasoning tasks using a defined set of primitive operations.

Figure 4:
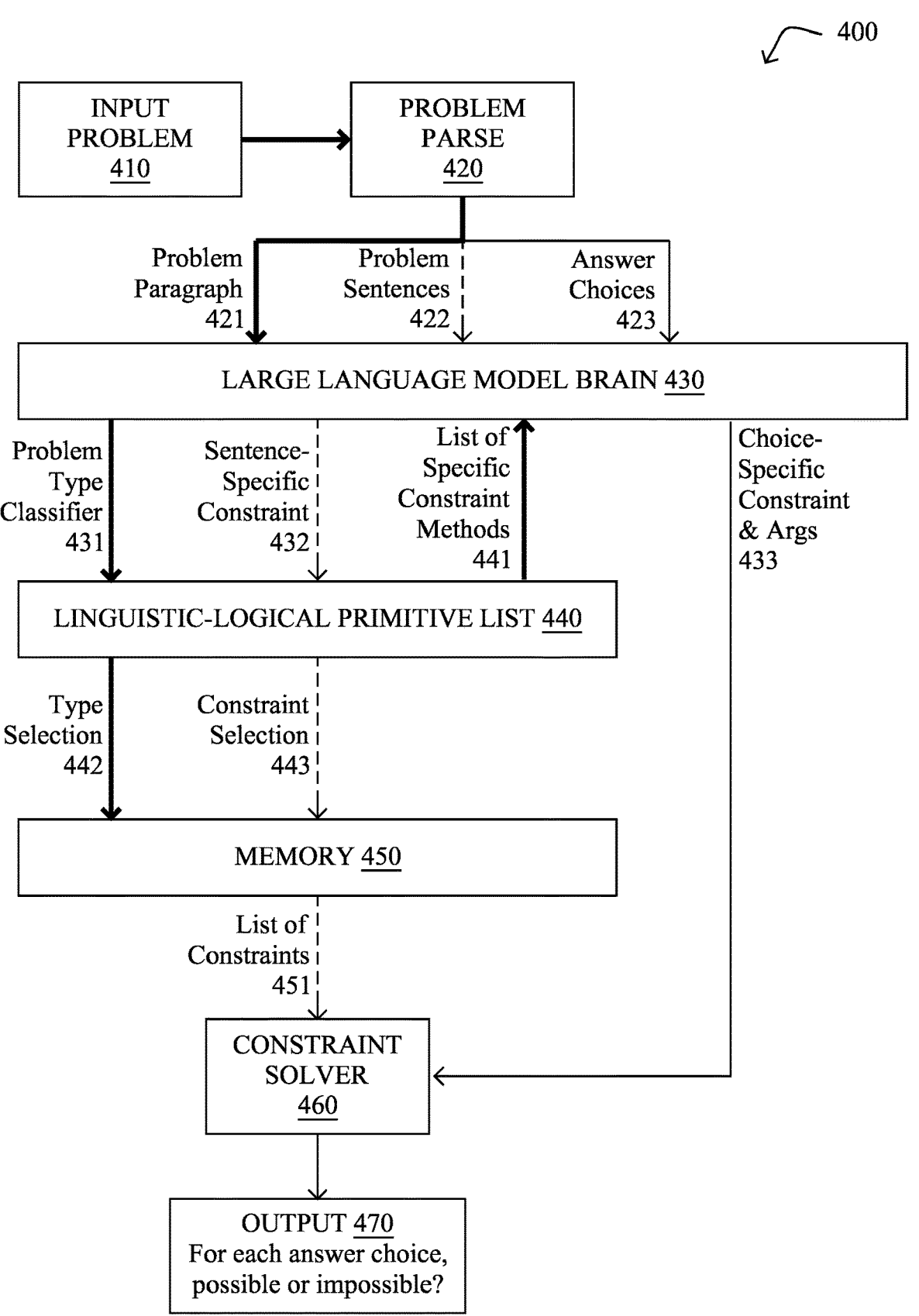
FIG. 4 illustrates an example architecture for memory-based function calling for logical formulation and inference for large language models (LLMs)

FIG. 4 illustrates an example of an architecture 400 for memory-based function calling for logical formulation and inference for LLMs according to one or more embodiments of the techniques herein, particularly for reasoning-classification conversion. As shown, an inputted problem 410 is split in the Problem Parse stage 420 into three components: the problem paragraph 411, individual problem sentences 422, and individual answer choices 423. Notably, in FIG. 4, solid lines follow problem paragraph logic, dashed lines follow individual problem sentence logic, and dotted lines follow answer choice logic.

The problem paragraph 411 is passed to the Large Language Model (LLM) "brain" (LLM 430) for problem-type classification (problem type classifier 431). This classification is used, in conjunction with linguistic-logical primitive list 440, as described further herein, to retrieve a list of problem-type-specific constraint methods 441. The LLM then iterates through each problem sentence (sentence-specific constraint 432) and chooses an equivalent constraint method (problem constraint selection 443) and extracts the accompanying arguments (choice-specific constraint and arguments 433). Problem type selection 442 and problem constraint selection 443 are passed to Memory 450, the latter to be stored in a growing list of problem constraints 451. Finally, the LLM performs the same mapping for each answer choice, and the validity of each answer choice constraint given the aggregated list of problem constraints is determined by the Constraint Solver 460 (i.e., output 470, where for each answer choice, a determination as to whether it is possible or impossible).

Notably, linguistic-logical primitives (LLPs) are essential elements in the reasoning approach presented. A primitive can be mathematically formulated as a function that takes a sentence $s_i$ and context C as inputs and returns an action A and potentially a change in memory state M:

$$p_i(s_i, C) \rightarrow (A, M). \qquad \text{Eq. 2}$$

Here:
- $s_i$: The sentence being processed.
- C: The context, including previous sentences and chosen primitives.
- A: The action to be taken, such as writing to memory or invoking a logical solving process.
- M: The change in memory state, if applicable.

The reasoning process herein iterates over the sequence of sentences, and for each sentence, the LLM predicts the appropriate primitive to be invoked. This primitive then performs its corresponding action, affecting the memory state and potentially moving the solution process forward.

As defined herein, linguistic hardness (as in, "hardness" or complexity in problem-solving) as the entropy $C_l(n)$ as the entropy of the distribution of interpretations I over a problem sentence S of length n. The linguistic complexity $C_l(n)$ is given by:

$$C_l(n) = -\sum_I P(I \mid S) \log P(I \mid S). \qquad \text{Eq. 3}$$

This quantifies the uncertainty or ambiguity in predicting the correct interpretation of a sentence. This can be computed empirically for any task. As LLMs get better, linguistic hardness goes down. The reasoning problem can be split into i sentences $s_i$. The prediction task can be formalized as a classification problem:

$$\hat{p}_i = \underset{p \in P}{\mathrm{argmax}} P(p \mid s_i, \text{context}). \qquad \text{Eq. 4}$$

It can be observed that linguistic hardness is lower for reasoning problems, for LLMs.

Figure 5A:
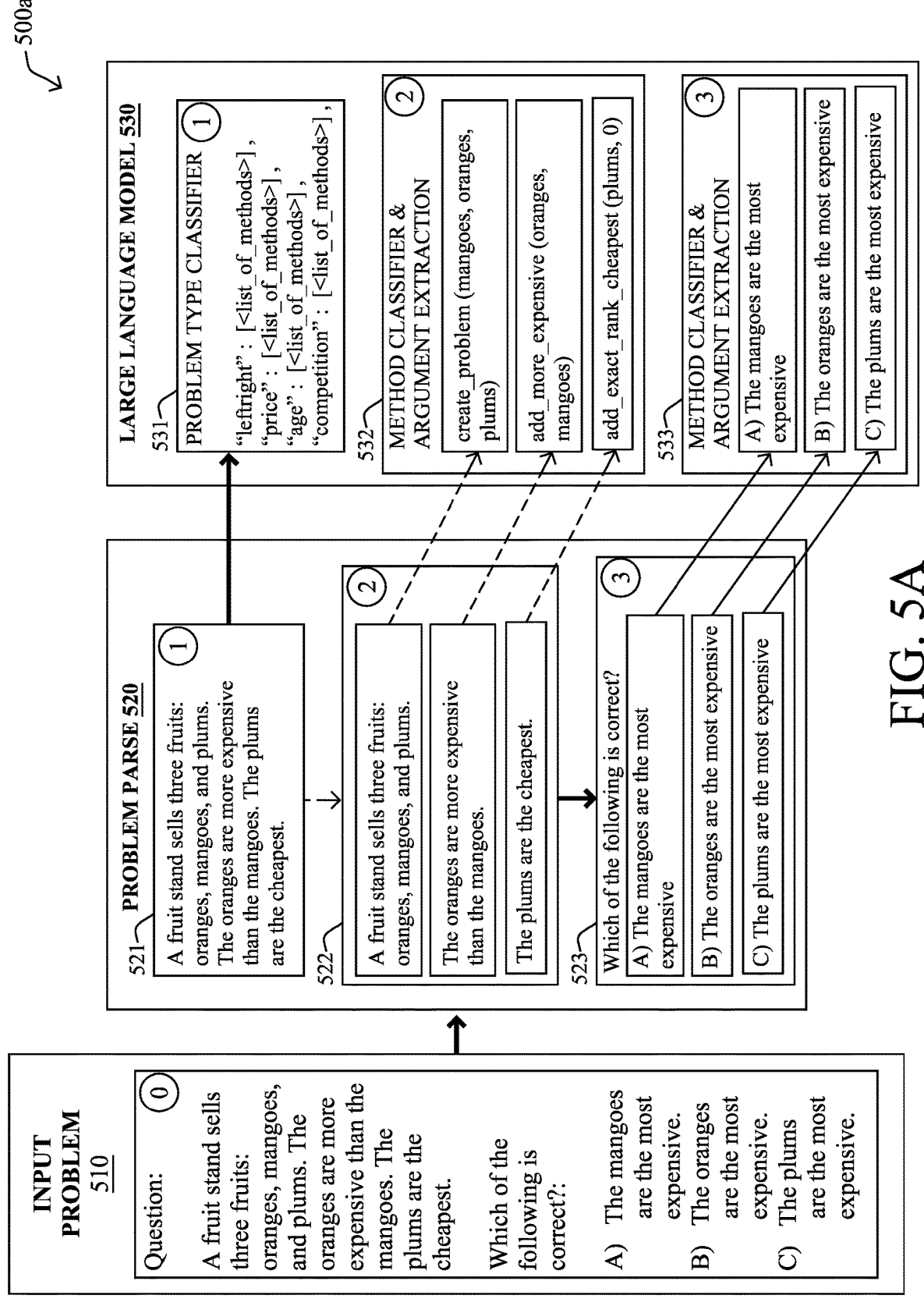

FIGS. 5A-5B illustrate an example processing diagram 500a-b of an input reasoning problem using memory-based function calling for logical formulation and inference for LLMs as described herein. Note that similar to FIG. 4, in FIGS. 5A-5B, solid lines follow problem paragraph logic, dashed lines follow individual problem sentence logic, and dotted lines follow answer choice logic. Also note that single-digit numbers within circles represent illustrative "stages" ("Stage 0" through "Stage 3") of the process herein, and as described below.

According to the working example of the proposed techniques herein on a reasoning problem the following stages herein may be processed:

Stage 0: An input problem 510 is inputted to a problem parser 520. For instance, the example problem may be: "A fruit stand sells three fruits: oranges, mangoes, and plums. The oranges are more expensive than the mangoes. The plums are the cheapest. Which of the following is correct? A) The mangoes are the most expensive. B) The oranges are the most expensive. C) The plums are the most expensive."

Stage 1: The parsed problem statement paragraph 521 ("A fruit stand sells three fruits: oranges, mangoes, and plums. The oranges are more expensive than the mangoes. The plums are the cheapest.") is passed to the LLM 530 and is classified by problem type classifier 531 as type "price". (For example, as shown, "leftright": [<list_of_methods>], "price": [<list_of_methods>], "age": [<list_of_methods>], "competition": [<list_of_methods>],".) The corresponding constraint methods 541 for "price" are fetched from memory 540 (e.g., "create_problem," "add_exact_rank_cheapest," "add_less_expensive," "check_rank_from_less_expensive," "add_exact_rank_more_expensive," "add_more_expensive").

Stage 2: The problem statement paragraph is decomposed into problem sentences 522 (e.g., "A fruit stand sells three fruits: oranges, mangoes, and plums." "The oranges are more expensive than the mangoes." "The plums are the cheapest."). Each sentence is mapped to a constraint method 532 and the relevant arguments are extracted by the LLM 530. (For example, the method classifier and argument extraction may result in "create_problem (mangoes, oranges, plums)", "add_more_expensive (oranges, mangoes)", and "add_exact_rank_cheapest (plums, 0)". Each sentence's equivalent constraint is added to a growing list of problem constraints (aggregate list 542) in memory 540. (e.g., "List of Problem Constraints: —<constraint1>; —<constraint2>; —<constraint3> . . . ")

Stage 3: The answer choice section of the input problem 510 is decomposed into individual choices 523 (e.g., "Which of the following is correct? A) The mangoes are the most expensive. B) The oranges are the most expensive. C) The plums are the most expensive."). Each choice is mapped to a constraint method 533 and the relevant arguments are extracted by the LLM 530. (For example, the method classifier and argument extraction may result in "add exact_rank_more_expensive (apples, 3)", "add_exact_rank_more_expensive (mangoes, 3)", and "add_exact_rank_more_expensive (oranges, 3)".) This method is passed to a constraint solver 550 along with the aggregate list 542, and the plausibility of such a scenario is determined, shown in component 551 (e.g., "pyconstraint-Given: <constraint1>, <constraint2>, <constraint3>; Now, add: <constraintN> . . . "). Whichever scenario is deemed possible is marked as "True" in the solver results 552. In this case, option B) is the only possible choice (e.g., "Solver Results: A) Impossible; B) Possible (True); C) Impossible").

In closing, FIG. 6 illustrates an example simplified procedure for memory-based function calling for logical formulation and inference for LLMs in accordance with one or more embodiments described herein. For example, a non-generic, specifically configured device (e.g., device 200, an apparatus) may perform procedure 600 by executing stored instructions (e.g., process 248). The procedure 600 may start at step 605, and continues to step 610, where, as described in greater detail above, the techniques herein parse, using a large language model, a constraint satisfaction problem statement into a sequence of sentences corresponding to a plurality of individual problem sentences and a plurality of individual answer choices. Also, in step 615, parsing may further parse the constraint satisfaction problem statement into a problem paragraph to further allow for classifying a particular problem type of the problem paragraph to thus retrieve a list of constraint methods specific to the particular problem type (for establishment of the respective problem constraint with accompanying arguments for each of the plurality of individual problem sentences, described below).

In step 620, the techniques herein may determine, using the large language model, which particular respective primitive functions to call from a set of logical-linguistic primitive functions for each sentence of the sequence of sentences. As noted above, this determination may include predicting which particular respective primitive functions to call based on a classification problem using the large language model, and/or predicting which particular respective primitive functions to call based on a context that includes previously processed sentences and correspondingly chosen primitive functions.

In step 625, the techniques herein may then invoke respective primitives from a set of logical-linguistic primitive functions to iteratively process:

i) each of the plurality of individual problem sentences to establish a respective problem constraint with accompanying arguments; and ii) each of the plurality of individual answer choices to establish a respective answer choice constraint with accompanying arguments.

Specifically, as described in greater detail above, invoking the primitives may cause an action to either perform a write operation to a memory or execution of a solution process that invokes a specific logical inference engine to solve a reasoning problem held in the memory. As also noted above, the set of logical-linguistic primitive functions may each be mathematically formulated as a function that takes a given sentence being processed and a context as inputs to return the action (e.g., and a change in memory state for the memory).

In step 630, the techniques herein store (e.g., in a memory), during invoking, the respective problem constraint with accompanying arguments for each of the plurality of individual problem sentences into an aggregate list of problem constraints. As such, in step 635, the techniques herein may then solve, after completion of the aggregate list of problem constraints (e.g., and using a constraint solver), the constraint satisfaction problem statement as a validity output for each answer choice constraint with accompanying arguments of the plurality of individual answer choices given the aggregate list of problem constraints, accordingly.

Procedure 600 may end at step 640. Note that other steps in accordance with the techniques herein, whether addition to the procedure above or separate functions, may also be included in the overall functionality of the system herein, and may have been omitted for brevity. For example, as described above, the techniques herein may also compute a linguistic complexity of the constraint satisfaction problem statement (e.g., for display, processing, comparative analysis, etc.), where computing the linguistic complexity may be based on computing an entropy of a distribution of interpretations over a problem sentence of a given length, as described in greater detail above.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: parsing, using a large language model, a constraint satisfaction problem statement into a sequence of sentences corresponding to a plurality of individual problem sentences and a plurality of individual answer choices; invoking respective primitives from a set of logical-linguistic primitive functions to iteratively process i) each of the plurality of individual problem sentences to establish a respective problem constraint with accompanying arguments and ii) each of the plurality of individual answer choices to establish a respective answer choice constraint with accompanying arguments; storing, during invoking, the respective problem constraint with accompanying arguments for each of the plurality of individual problem sentences into an aggregate list of problem constraints; and solving, after completion of the aggregate list of problem constraints, the constraint satisfaction problem statement as a validity output for each answer choice constraint with accompanying arguments of the plurality of individual answer choices given the aggregate list of problem constraints.

In still other implementations, a tangible, non-transitory, computer-readable medium storing program instructions that cause a device to execute a process comprising: parsing, using a large language model, a constraint satisfaction problem statement into a sequence of sentences corresponding to a plurality of individual problem sentences and a plurality of individual answer choices; invoking respective primitives from a set of logical-linguistic primitive functions to iteratively process i) each of the plurality of individual problem sentences to establish a respective problem constraint with accompanying arguments and ii) each of the plurality of individual answer choices to establish a respective answer choice constraint with accompanying arguments; storing, during invoking, the respective problem constraint with accompanying arguments for each of the plurality of individual problem sentences into an aggregate list of problem constraints; and solving, after completion of the aggregate list of problem constraints, the constraint satisfaction problem statement as a validity output for each answer choice constraint with accompanying arguments of the plurality of individual answer choices given the aggregate list of problem constraints.

The techniques described herein, therefore, provide for memory-based function calling for logical formulation and inference for LLMs. In particular, experimental results substantiate that under the techniques herein, tasks with significant computational hardness can be converted to a form that is easier for LLMs to solve, and yields a 40% improvement over baselines. This opens up new avenues for future research into hybrid cognitive models that integrate symbolic and neural approaches.

Illustratively, the techniques described herein may be performed by hardware, software, and/or firmware, (e.g., an "apparatus") such as in accordance with the memory-based LLM function calling process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly. Also, while certain embodiments are described herein with respect to using certain models for particular purposes, the models are not limited as such and may be used for other functions, in other embodiments.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

parsing, by a device and using a large language model, a constraint satisfaction problem statement into a sequence of sentences corresponding to a plurality of individual problem sentences and a plurality of individual answer choices;

invoking, by the device, respective primitives from a set of logical-linguistic primitive functions to iteratively process i) each of the plurality of individual problem sentences to establish a respective problem constraint with accompanying arguments and ii) each of the plurality of individual answer choices to establish a respective answer choice constraint with accompanying arguments;

storing, by the device during invoking, the respective problem constraint with accompanying arguments for each of the plurality of individual problem sentences into an aggregate list of problem constraints; and solving, by the device and after completion of the aggregate list of problem constraints, the constraint satisfaction problem statement as a validity output for each answer choice constraint with accompanying arguments of the plurality of individual answer choices given the aggregate list of problem constraints.

2. The method of claim 1, further comprising:

determining, using the large language model, which particular respective primitive functions to call from the set of logical-linguistic primitive functions for each sentence of the sequence of sentences.

3. The method of claim 2, wherein determining comprises:

predicting which particular respective primitive functions to call based on a classification problem using the large language model.

4. The method of claim 2, wherein determining comprises:

predicting which particular respective primitive functions to call based on a context that includes previously processed sentences and correspondingly chosen primitive functions.

5. The method of claim 1, wherein invoking respective primitives comprises:

causing an action to either perform a write operation to a memory or execution of a solution process that invokes a specific logical inference engine to solve a reasoning problem held in the memory.

6. The method of claim 5, wherein the set of logical-linguistic primitive functions are each mathematically formulated as a function that takes a given sentence being processed and a context as inputs to return the action.

7. The method of claim 5, wherein invoking respective primitives further comprises:

returning a change in memory state for the memory.

8. The method of claim 1, wherein parsing further parses the constraint satisfaction problem statement into a problem paragraph, the method further comprising:

classifying a particular problem type of the problem paragraph; and retrieving a list of constraint methods specific to the particular problem type for establishment of the respective problem constraint with accompanying arguments for each of the plurality of individual problem sentences.

9. The method of claim 1, further comprising:

computing a linguistic complexity of the constraint satisfaction problem statement.

10. The method of claim 9, wherein computing the linguistic complexity is based on computing an entropy of a distribution of interpretations over a problem sentence of a given length.

11. The method of claim 1, wherein storing comprises:

storing the aggregate list of problem constraints in a memory.

12. The method of claim 1, wherein solving comprises:

using a constraint solver associated with the large language model.

13. An apparatus, comprising:

one or more network interfaces to communicate with a network;

a processor coupled to the one or more network interfaces and configured to execute one or more processes; and a memory configured to store a process that is executable by the processor, the process comprising:

parsing, using a large language model, a constraint satisfaction problem statement into a sequence of sentences corresponding to a plurality of individual problem sentences and a plurality of individual answer choices;

invoking respective primitives from a set of logical-linguistic primitive functions to iteratively process i) each of the plurality of individual problem sentences to establish a respective problem constraint with accompanying arguments and ii) each of the plurality of individual answer choices to establish a respective answer choice constraint with accompanying arguments;

storing, during invoking, the respective problem constraint with accompanying arguments for each of the plurality of individual problem sentences into an aggregate list of problem constraints; and solving, after completion of the aggregate list of problem constraints, the constraint satisfaction problem statement as a validity output for each answer choice constraint with accompanying arguments of the plurality of individual answer choices given the aggregate list of problem constraints.

14. The apparatus of claim 13, the process further comprising:

determining, using the large language model, which particular respective primitive functions to call from the set of logical-linguistic primitive functions for each sentence of the sequence of sentences.

15. The apparatus of claim 14, wherein determining comprises:

predicting which particular respective primitive functions to call based on a classification problem using the large language model.

16. The apparatus of claim 14, wherein determining comprises:

predicting which particular respective primitive functions to call based on a context that includes previously processed sentences and correspondingly chosen primitive functions.

17. The apparatus of claim 13, wherein invoking respective primitives comprises:

causing an action to either perform a write operation to a memory or execution of a solution process that invokes a specific logical inference engine to solve a reasoning problem held in the memory.

18. The apparatus of claim 13, wherein parsing further parses the constraint satisfaction problem statement into a problem paragraph, the process further comprising:

classifying a particular problem type of the problem paragraph; and retrieving a list of constraint methods specific to the particular problem type for establishment of the respective problem constraint with accompanying arguments for each of the plurality of individual problem sentences.

19. The apparatus of claim 13, the process further comprising:

computing a linguistic complexity of the constraint satisfaction problem statement.

20. A tangible, non-transitory, computer-readable medium storing program instructions that cause a device to execute a process comprising:

parsing, using a large language model, a constraint satisfaction problem statement into a sequence of sentences corresponding to a plurality of individual problem sentences and a plurality of individual answer choices;

invoking respective primitives from a set of logical-linguistic primitive functions to iteratively process i) each of the plurality of individual problem sentences to establish a respective problem constraint with accompanying arguments and ii) each of the plurality of individual answer choices to establish a respective answer choice constraint with accompanying arguments;

storing, during invoking, the respective problem constraint with accompanying arguments for each of the plurality of individual problem sentences into an aggregate list of problem constraints; and solving, after completion of the aggregate list of problem constraints, the constraint satisfaction problem statement as a validity output for each answer choice constraint with accompanying arguments of the plurality of individual answer choices given the aggregate list of problem constraints.

* * * * *